Aug. 22, 1950     R. H. RANGER     2,519,397
RADIO LOCATION DEVICE

Filed Oct. 16, 1943     6 Sheets-Sheet 2

INVENTOR
RICHARD H. RANGER
BY William P. Hall
ATTORNEY

Aug. 22, 1950  R. H. RANGER  2,519,397
RADIO LOCATION DEVICE
Filed Oct. 16, 1943  6 Sheets-Sheet 3
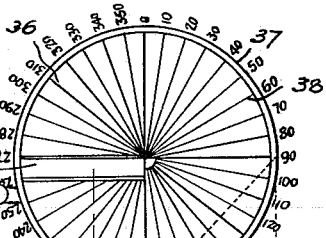
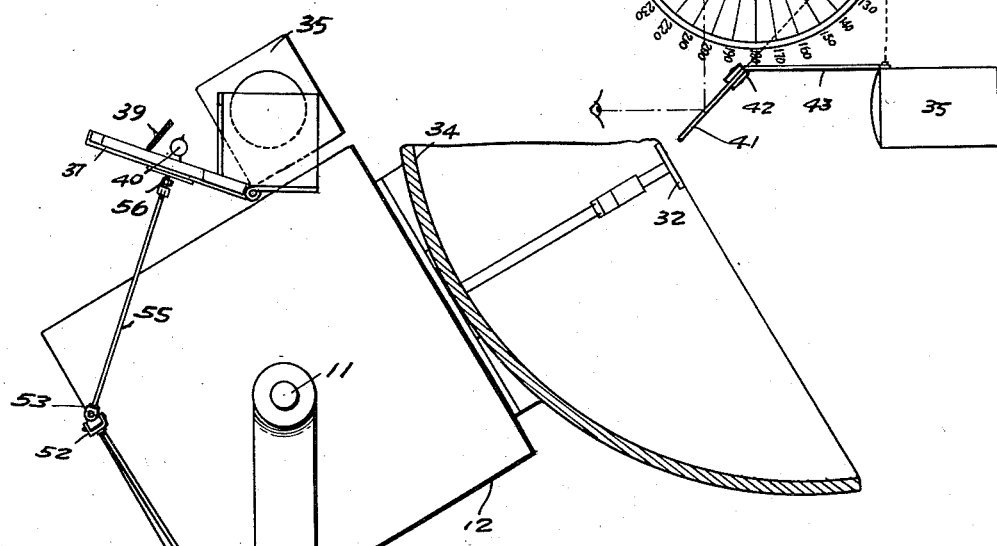
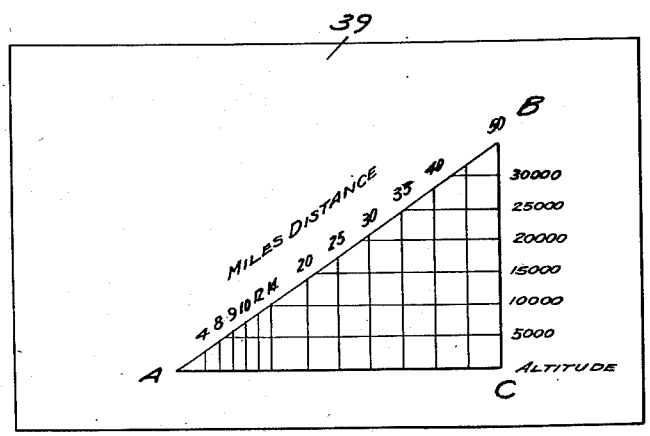
INVENTOR
RICHARD H. RANGER
BY William P. Hall
ATTORNEY

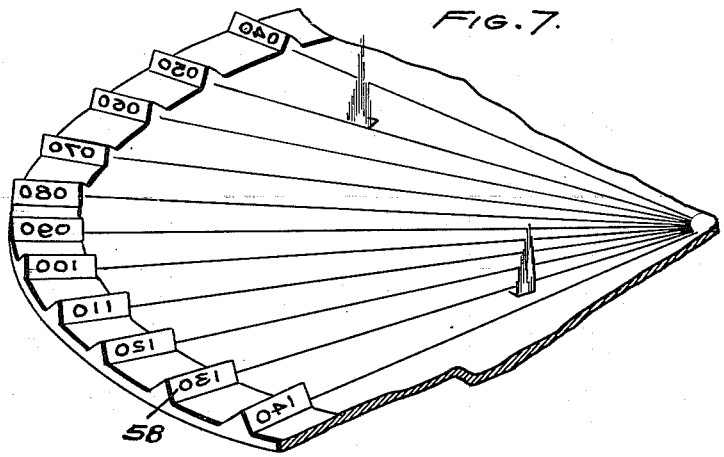
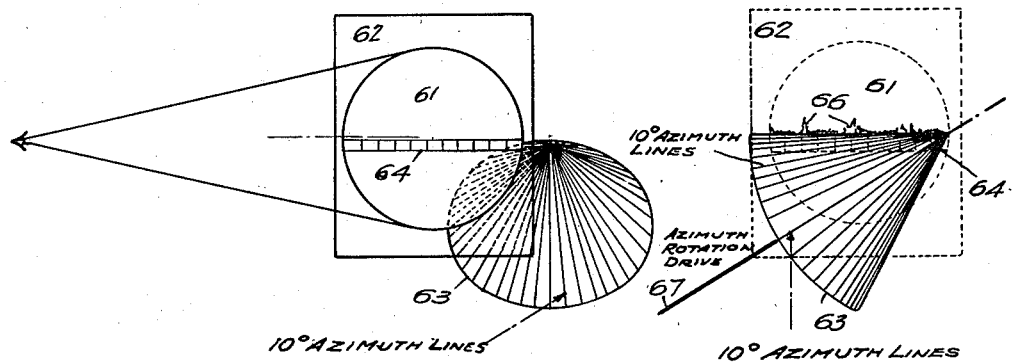
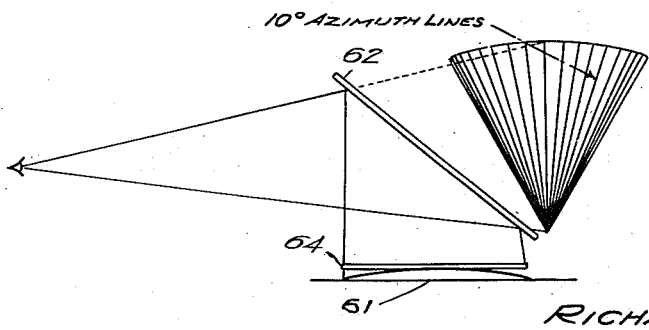

Aug. 22, 1950   R. H. RANGER   2,519,397
RADIO LOCATION DEVICE
Filed Oct. 16, 1943   6 Sheets-Sheet 5
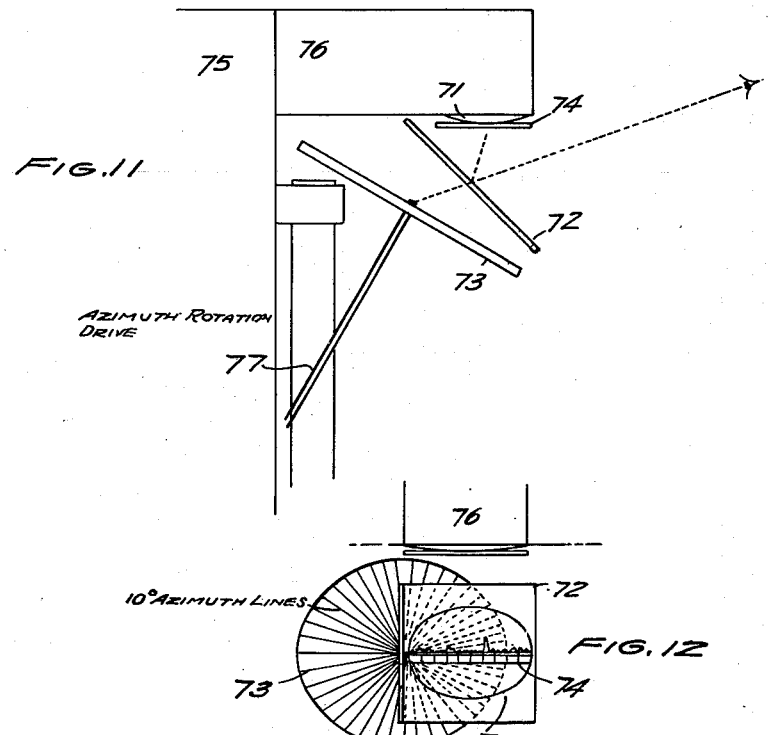
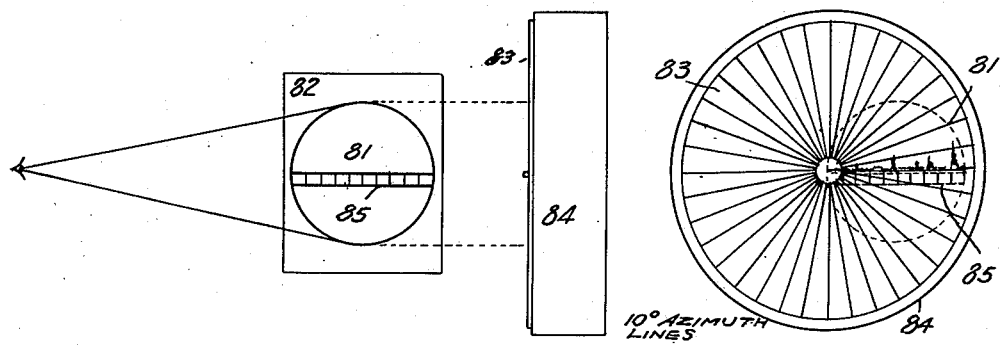
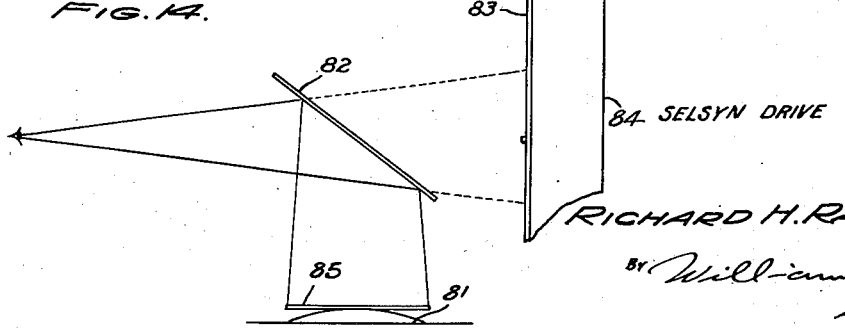

Aug. 22, 1950  R. H. RANGER  2,519,397
RADIO LOCATION DEVICE
Filed Oct. 16, 1943  6 Sheets-Sheet 6

INVENTOR
RICHARD H. RANGER
BY William D. Hall
ATTORNEY

Patented Aug. 22, 1950

2,519,397

UNITED STATES PATENT OFFICE 2,519,397

RADIO LOCATION DEVICE

Richard H. Ranger, United States Army

Application October 16, 1943, Serial No. 506,559

14 Claims. (Cl. 343—10)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to improvements in radio location devices and more particularly to so-called "radar" devices adapted to rapidly locate airplanes and other objects for military and other purposes.

Heretofore, "radar" devices have been effective in determining the straight line distance between the range finder and an object such as an airplane, and the like. However, such information, while valuable, is insufficient for complete protection from approaching enemy airplanes in that no information is given as to the altitude and horizontal distance of the approaching aircraft. Of course, the altitude and horizontal distance can be computed, the angle of elevation being known; but such computations require too much time.

It is, therefore, an object of this invention to provide a device for instantly determining the altitude and horizontal distance away of aircraft, in addition to the straight line distance, and all under the simple direct control of a single operator.

A further object is the provision of a ranging device of simple structure which can be easily and quickly manipulated by persons having relatively little skill, the device having a combined scale arrangement by means of which desired information pertaining to an approaching object can be instantly and simultaneously determined.

These and other objects are attained by the novel structure and arrangements of parts hereinafter described and illustrated in the accompanying drawings, forming a part hereof, and in which:

Fig. 3 is a right side elevational view of the device.

Fig. 4 is a plan view of one of the indicating scales used in the device.

Fig. 5 is a view of one of the scales.

Fig. 7 is a plan view of a modified form of azimuth disc adapted to be used in the device.

Fig. 8 is a side view of a modified form of scale arrangement.

Fig. 9 is a plan view of the form shown in Fig. 8.

Fig. 10 is a front view of the form shown in Fig. 8.

Fig. 11 is a side view of another modified form of scale arrangement.

Fig. 12 is a front view of the form shown in Fig. 11.

Fig. 13 is a side view of another modified form of scale arrangement.

Fig. 14 is a plan view of the form shown in Fig. 13.

Fig. 15 is a front view of the form shown in Fig. 13.

Figure 1:
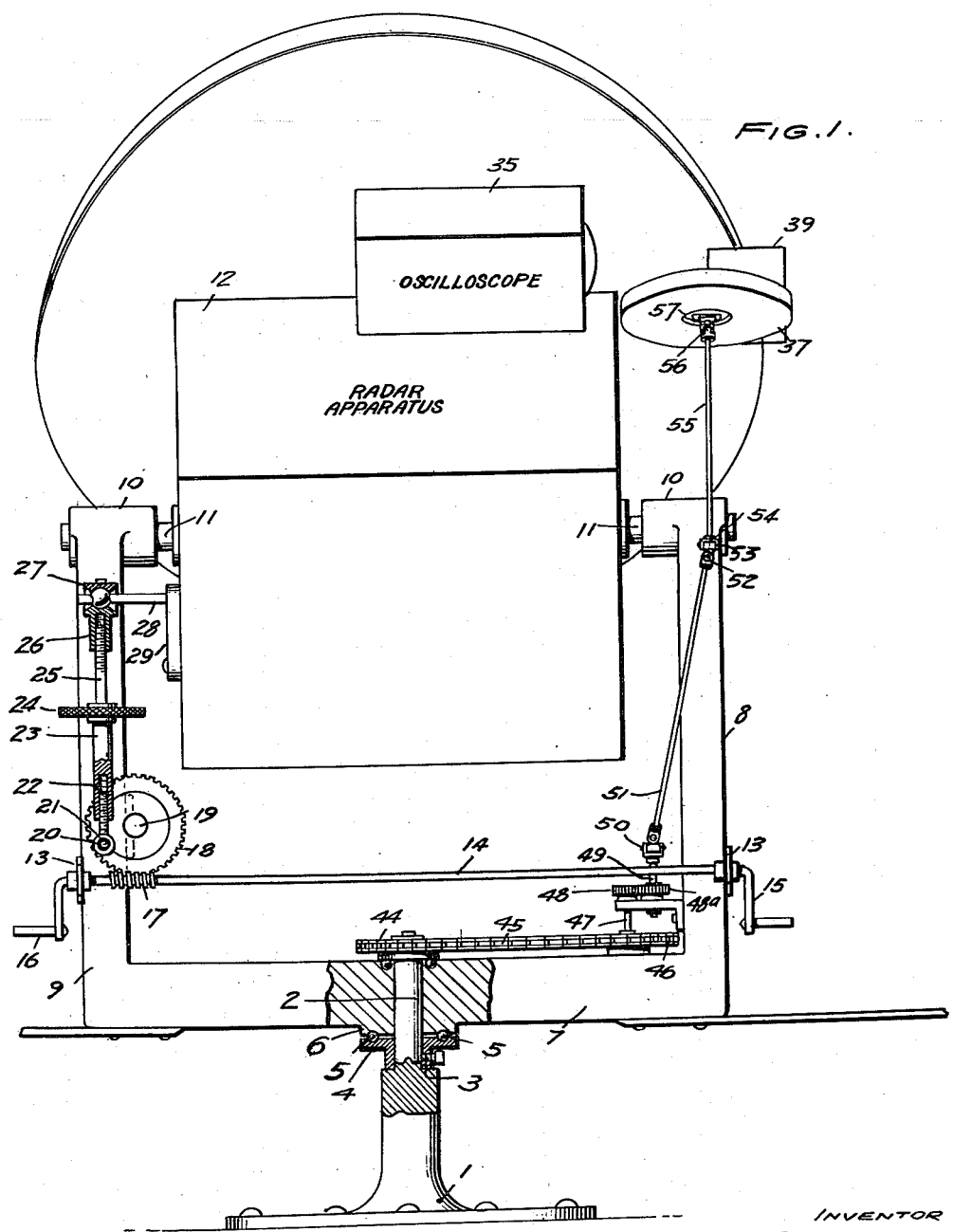
Fig. 1 is a rear elevational view of the ranging device embodying the invention.
Figures 2, 6:
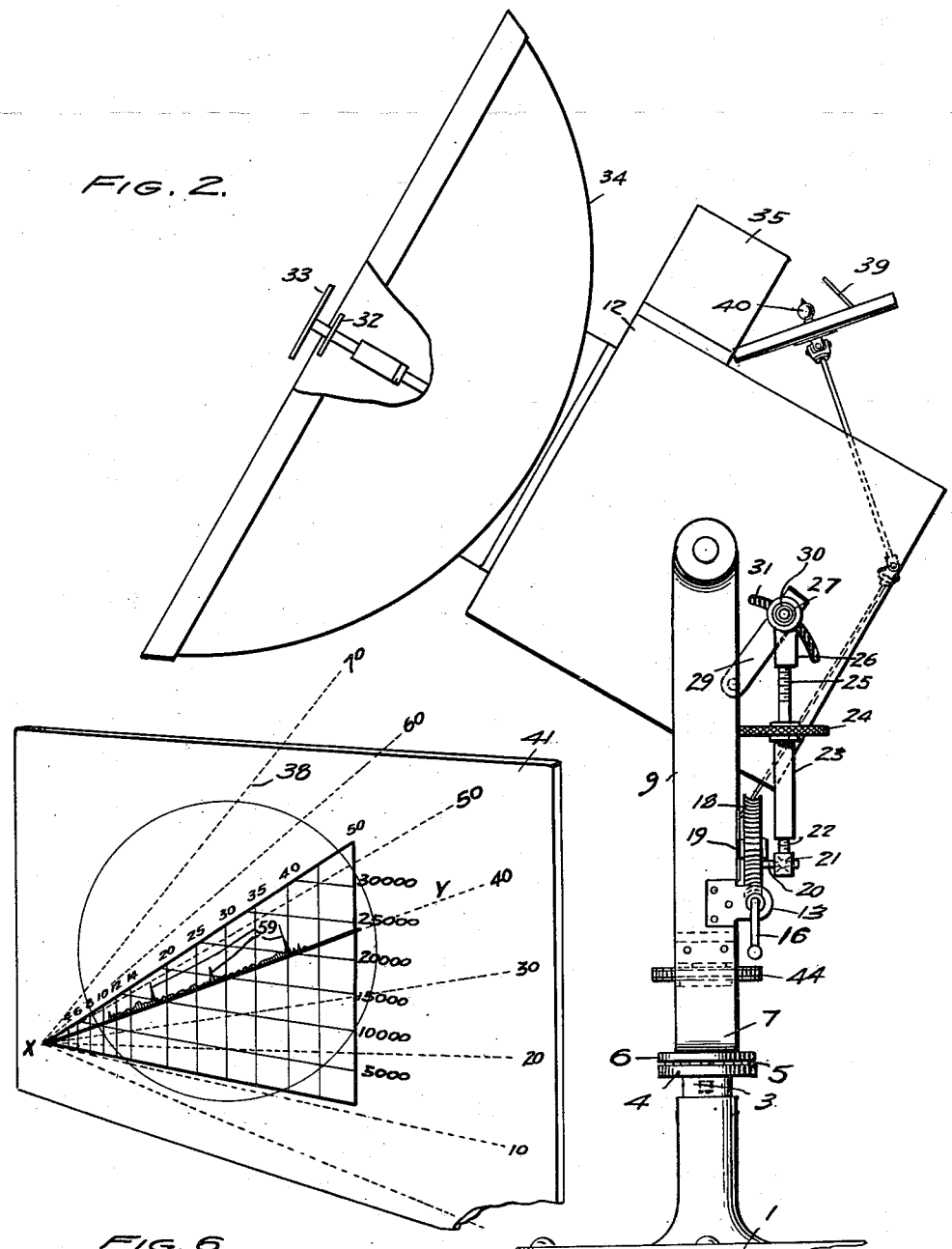
Fig. 2 is a left side elevational view of the device.
Fig. 6 is a view of a transparent and reflecting plate glass with reflections from an azimuth disc and an image of an oscilloscope superimposed thereon.

Referring to the drawings, in Figs. 1, 2, 3, the device is shown to comprise a base 1, having a shaft 2 projecting upwardly therefrom. Fixed to shaft 2 is a collar 3 having a flange 4 carrying ball bearings 5, upon which rests a flange 6 integral with a cross member 7 of a U-shaped frame having legs 8 and 9.

The upper ends of legs 8 and 9 are provided with bearings 10 receiving stub shafts 11 projecting from the sides of a casing 12 in which is mounted "radar" equipment for emitting short wave signals at very high frequencies.

Projecting laterally from legs 8 and 9 are ears 13 which serve as bearings to rotatably support a shaft 14, having at each end thereof handles 15 and 16. Adjacent the leg 9, the shaft 14 is provided with a worm gear 17 in mesh with a worm wheel 18 rotatably mounted on a stub shaft 19 projecting from leg 9.

Eccentrically positioned and projecting from wheel 18 is a pin 20 which has a ball and socket connection 21 with a vertically extending threaded rod 22, threadedly engaging a collar 23 having an integral hand wheel 24. Projecting upwardly from the collar 23 and hand wheel 24 is another rod 25, the upper end of which threadedly engages a tubular member 26 having a ball and socket connection at 27 with a horizontally extending link 28, which is pivotally connected to an arm 29, pivotally supported by casing 12. The link 28 has rotatably mounted thereon a roller 30, which is positioned in an arcuate slot 31 in the wall of casing 12.

By means of the structure above described the casing 12 can be adjusted to various positions. The U-shaped frame can be rotated horizontally about the shaft 2, simply by pushing it by hand, and casing 12 can be rapidly tilted by manipulating handles 15 and 16 to rotate worm gear 17, which rotates wheel 18, causing the eccentric pin 20 to move shafts 22 and 25 upward or downward as may be desired. Movement of shaft 25 causes link 28 and arm 29 to tilt the casing 12. For fine adjustments the hand wheel 24 can be rotated to adjust the threaded engagement between collar 23 and rod 22, and between tube 26 and rod 25.

Mounted in casing 12 is a radio transmitting apparatus for generating very short wave pulses which are radiated by an antenna 32 extending from casing 12. Positioned in front of the antenna 32 is a reflector plate 33, which reflects radiations from the antenna back to a large reflector 34, preferably of the parabolic type, which projects the radiations outwardly towards the object being located. When the radiations strike the object, they are reflected back to the antenna and directed to a radio receiving apparatus, also contained in casing 12. The radio transmitting and receiving apparatus is connected to an oscilloscope 35 so that each transmitted pulse will appear as a sharp peak on the face of the oscilloscope and the received pulse will appear as a smaller sharp peak. The distance of the object from the antenna is determined by the speed of light and the time elapsing between a transmitted pulse and a received pulse. Immediately over the face of the oscilloscope is mounted a transparent scale calibrated to indicate directly the straight line distance away of the airplane or other object from the antenna 32. This distance is determined on the scale by the space between the indication of a transmitted pulse and the indication of a received pulse. However, merely ascertaining the straight line distance away of the airplane is not enough for adequate defense and attack operations. It is preferable that the altitude, azimuth and horizontal distance away be known instantly.

To obtain such information, azimuth disc 36 is rotatably positioned in a pan 37. The disc 36 is divided by radial lines 38 (see Fig. 4), at ten degree intervals. Positioned over the disc 36 is an inclined glass 39 having reflecting properties. Images of the lines 38 appear in the glass 39, the lines being illuminated by a small lamp 40. The glass 39 lies in a plane perpendicular to the plane of the face of the oscilloscope. This glass 39 is preferably a mirror of the half front silvered type which has a very thin silver coating sufficient to provide reflecting properties, at the same time maintaining transparent properties.

A sheet 41 of plate glass having transparent and reflecting properties is positioned in front of the oscilloscope and inclined at an angle to the plane of the face of the oscilloscope. The glass 41 is also inclined to the plane of the glass 39, and receives reflections from glass 39. By looking at the glass 41, as shown in Fig. 4, the face of the oscilloscope and the reflections from the glass 39 can be seen simultaneously, with the reflections from glass 39 superimposed on the image of the face of the oscilloscope.

The glass 41 is held by a frame supported by a block 42 fixed to pan 37. A link 43 is attached to block 42 and pivoted to the oscilloscope 35.

Etched or otherwise marked on glass 39 is a triangular figure, as shown in Fig. 5, having horizontal lines to indicate altitude, and vertical lines to indicate horizontal distance as will be hereinafter explained.

As the U-frame is rotated to different azimuth positions, it is necessary to rotate the azimuth disc 36 in a one to one ratio reversely therewith, in order to obtain correct indications. The rotation of the azimuth disc 36 can be accomplished manually by the structure shown in Figs. 1, 2, 3. Referring to Fig. 1, the shaft 2 is shown to have rotatably mounted at the upper end thereof a sprocket wheel 44 over which passes a chain 45, which also passes over a sprocket wheel 46 fixed to a stub shaft 47 rotatably supported by cross member 7. Fixed to the upper end of shaft 47 is a gear 48 enmeshed with another gear 48a supporting a link 49 which is connected by a universal joint 50 to a link 51, the latter being connected by universal joint elements 52, 53, 54 to a link 55. The upper end of link 55 is provided with a swivel joint 56 passing through an aperture 57 in pan 37 and attached to a pivot pin rotatably positioned in bearings on the under side of disc 36. The linkage system is designed and proportioned so that one complete revolution of the U-frame will cause one complete revolution in a reverse direction of the azimuth disc 36, the frame and disc moving in a one-to-one ratio.

When legs 8 and 9 are rotated about shaft 2, the pan 37 will move therewith, and the azimuth lines 38 of disc 36 will rotate with respect to the pan the same number of degrees as the pan rotates about shaft 2. However, any given azimuth line which, for example, is pointing north will remain pointing north while the legs 8 and 9 are rotated. The linkage system maintains the pan and the glasses at the same inclination and relative positions at all times.

In operation, the U-frame is rotated about its axis until an appreciable signal is received and indicated on the face of the oscilloscope. The casing with the oscilloscope 35 is then tilted by means of the handles 15 or 16, and adjusted to obtain the maximum indication on the oscilloscope. The "radar" equipment in casing 12 sends out very high frequency signals to the aircraft being located, and these signals are reflected back to the antenna, appearing on the oscilloscope as sharp peaks, see Fig. 6. The line X—Y on the face of the oscilloscope is divided and marked so that the position of a peak on the line will directly indicate the straight line distance away of the aircraft. The handwheel 24 enables fine adjustments of the casing 12 to the exact angle of elevation.

The azimuth disc 36 is illuminated by the lamp 40 and reflections from the disc 36 appear on the glass 39 which has marked thereon the triangular scale as shown in Fig. 5. This scale has markings along the line A—B to indicate horizontal distances, and markings along the line B—C to indicate altitudes. In the glass 39, superimposed on the triangular scale will appear reflections of the azimuth lines on disc 36. The images on mirror 39 are in turn reflected on to glass 41 through which the face of the oscilloscope can be viewed. An observer will, accordingly, simultaneously view the face of the oscilloscope and the reflections on the glass 41, and there will be presented a view such as shown in Fig. 6, in which the peaks 59 of the oscilloscope indications are superimposed in definite positions on the reflected images of the triangular scale and azimuth lines. The base line X—Y of the oscilloscope scale will be shown in association with the azimuth lines 38 reflected on glass 41, and readings are taken where the peaks appear. Since the oscilloscope 35 moves with the casing 12, the base line X—Y will be inclined to the horizontal. For example, in Fig. 6 a peak appears on a line indicating a horizontal distance of 40 miles. The peak also appears on the azimuth line for 40 degrees, and on a line indicating an altitude of 20,000 feet. All of this information is indicated simultaneously, and no computations are necessary.

The numbers on the disc 36 are inverted so that when reflected they will appear properly. In Fig. 7 is shown a modified form of disc in which the numbers appear on raised portions 58 which provide better reflections.

In Figs. 8, 9, and 10 are shown views of a modified form of indicator in which the disc 36 is replaced by a cone 63 having marked thereon azimuth lines spaced 10° apart and radiating from the apex of the cone. In this modification, the observer views the azimuth cone 63 directly through plate glass 62 which has both transparent and reflecting properties. Positioned immediately in front of the face of the oscilloscope 61 (which is in a vertical plane) is a sheet 64 of Plexiglas having marked thereon a mileage range scale. (See Fig. 8.) The peak indications 66 of the oscilloscope, together with the mileage scale, will be reflected by the plate glass 62, and will be viewed simultaneously with the azimuth cone 63 by the observer, and appear as shown in Fig. 10. This arrangement enables the convenient ascertainment simultaneously of the straight line distance away of an aircraft together with its azimuth. A drive 67 causes the cone 63 to rotate in synchronism with the horizontal rotation of a supporting frame as described in connection with Figs. 1, 2, 3.

A further modification is shown in Figs. 11 and 12 in which an azimuth disc 73 is slightly inclined and rotated by a drive 77 in synchronism with the horizontal rotation of the supporting frame as hereinbefore described. The azimuth disc 73 has radial lines marked thereon spaced 10° apart and the disc is viewed directly by an observer looking downwardly through a sheet 72 of plate glass which has both transparent and reflecting properties. Positioned above the glass 72 and in a horizontal plane is an oscilloscope 76 having a sheet 74 of Plexiglas over the face 71 thereof. The Plexiglas 74 has a mileage range scale marked thereon, and the scale, together with indications of the oscilloscope are reflected on glass 72, so that an observer can simultaneously determine the straight line distance away and the azimuth of an aircraft. The oscilloscope 76 is mounted on a casing 75 and connected to "radar" equipment for emitting and receiving very high frequency signals. In Fig. 12 is shown a view of the azimuth disc 73 and the images on the glass 72.

In Figs. 13, 14, 15 is shown another modification in which the azimuth disc 83 is vertically arranged, and rotated by means of a Selsyn drive 84 or the like to move in synchronism with the movements of the supporting frame, as above described. The disc 83 is viewed directly through a sheet 82 of plate glass, which simultaneously, receives reflections of the peak indications from the oscilloscope 81 and reflection from Plexiglas sheet 85 having a mileage range scale. The face of the oscilloscope is in a vertical plane at right angles to the plane of the disc. By this arrangement the straight line distance away and the azimuth can be simultaneously ascertained.

Figure 16:
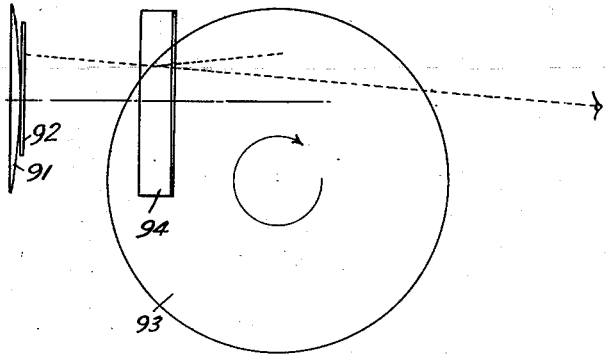
Fig. 16 is a plan view of a further modification of indicating scale arrangement.
Figure 18:
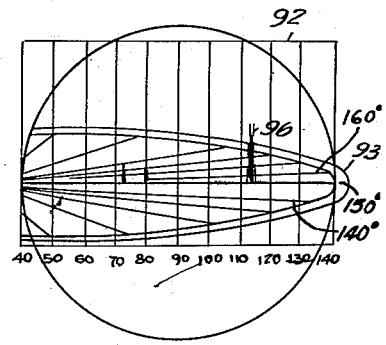
Fig. 18 is a front view of the form shown in Fig. 16.
Figure 17:
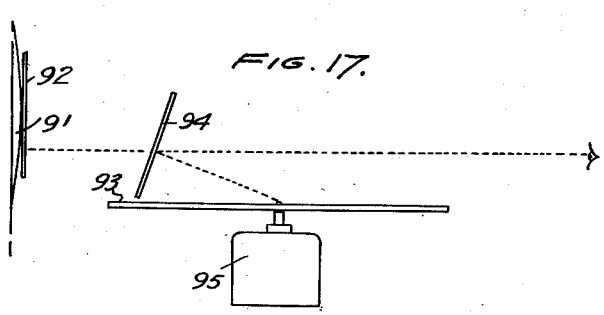
Fig. 17 is a side view of the modification shown in Fig. 16.

In Figs. 16, 17 and 18, the azimuth disc 93 is horizontally positioned and is moved by a Selsyn drive 95 in synchronism with the horizontal movements of a supporting frame. Reflections from the disc 93 appear upon a vertically inclined plate glass 94, through which peak indications on the oscilloscope 91 and mileage range scale on the Plexiglas sheet 92 are viewed directly. The face of the oscilloscope is in a vertical plane. The view appears to the observer as shown in Fig. 18, and the azimuth and straight line distance can be easily ascertained. For example, in Fig. 18, the large peak 96 appears between 110 and 120 miles with an azimuth of 150°.

From the above description it will be seen that there has been provided simple arrangements and structure for instantly determining simultaneously the straight line distance away and the azimuth of an aircraft or the like. In the structure shown in Figs. 1, 2, 3, the horizontal distance and altitude are also simultaneously determined. While these determinations can ordinarily be made by a single observer, if necessary, several observers can be used to note the various data.

Figure 19:
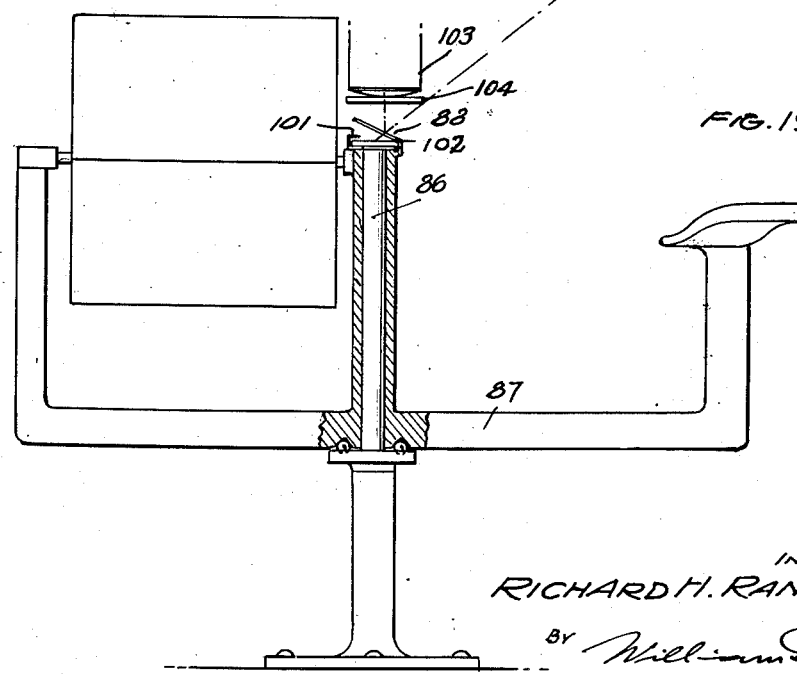
Fig. 19 is an elevational view of another modification of the invention.

In Figure 19 is shown a further modification in which the azimuth disc 102 remains stationary on a pedestal 86, which rotatably supports a frame 87, upon which the driver sits. The oscilloscope 103 is mounted above the disc and rotates with the frame. Positioned over the face of oscilloscope 103 is a Plexiglas sheet 104 which bears a mileage range scale. The operator views the disc 102 through the glass 88 which also reflects an image of the face of the oscilloscope. The frame 87 has a pointer 101 adjacent the disc 102 to indicate the angle which the frame is turned. The scales shown in the triangular figure on glass 39, see Fig. 5, can be made from mathematical computations, or by calibration. With the line crossing lines A B perpendicular to line B C, horizontal distance can be read. Direct distances can be read by making the lines crossing A B arcuate with A as a center.

As stated above, the pan 37 is fixed to a block 42, attached to link 43, which is pivotally connected to the oscilloscope 35. This arrangement enables the pan to remain substantially stationary, with a very slight tilting movement as the oscilloscope is tilted through a large angle, so that the plane of the glass 41 and the plane of the face of the oscilloscope will meet at that center line of the azimuth disc which is parallel with the length of glass 39.

The invention having been described, what is claimed is:

1. A location device, comprising a frame mounted for rotation in a horizontal plane, a casing pivotally supported by the frame so that it can be tilted in a vertical plane, apparatus carried by the casing for projecting and receiving very high frequency signals, an oscilloscope mounted on the casing and connected to indicate signals received by the said apparatus, a rotatable azimuth disc having radiating lines marked thereon spaced by equal intervals, a mirror positioned above the disc to receive reflections of the lines, a scale marked on the mirror, means to rotate the disc in synchronism with the rotation of the frame, and a sheet of plate glass positioned to receive reflections from the mirror and to enable the indications on the oscilloscope to be viewed simultaneously, said indications and reflections being superimposed.

2. A radio location device, comprising a U-shaped frame mounted for rotation in a horizontal plane, a casing pivotally mounted on the frame for tilting movements in a vertical plane, radio transmitting and receiving apparatus carried by the casing, an oscilloscope mounted on the casing and connected to the radio apparatus to indicate signals, an azimuth disc positioned near the oscilloscope, said disc having marked thereon a plurality of radial lines spaced apart at equal intervals, a reflecting glass positioned above the disc to reflect the radial lines, means to rotate the disc in synchronism with the horizontal movements of the frame, and a sheet of plate glass positioned so that the oscilloscope can be viewed directly and at the same time provide a view of the reflections of the radial lines in the reflecting glass.

3. A radio location device, comprising a frame rotatable in a horizontal plane, a casing pivotally mounted on the frame for tilting movements in a vertical plane, radio apparatus carried by the casing, an oscilloscope mounted on the casing and connected to the radio apparatus to indicate signals, an azimuth disc positioned near the oscilloscope, said disc having marked thereon a plurality of radial lines spaced apart at equal intervals, a mirror positioned above the disc to reflect said lines, a scale marked on the mirror, a sheet of glass positioned to receive reflections from the mirror and to enable the oscilloscope to be viewed simultaneously with the images of the scale and radial lines and the face of the oscilloscope superimposed, and means to rotate the azimuth disc in synchronism with the horizontal rotation of the frame.

4. A radio location device, comprising apparatus for transmitting and receiving short wave signals, means for moving the apparatus in a horizontal plane and in a vertical plane, an oscilloscope mounted to move with the apparatus and indicate signals transmitted and received, an azimuth disc having a plurality of spaced radial lines thereon, means to rotate the disc in synchronism with the horizontal rotation of the apparatus, a mirror positioned above the disc to receive reflections of said lines, said mirror having marked thereon a scale to indicate horizontal distance and altitude, and a sheet of transparent glass having reflecting properties, said glass being positioned to receive reflections from the mirror and at the same time provide a direct view of the face of the oscilloscope, the reflections from the mirror and the image of the oscilloscope being superimposed.

5. A radio location device, comprising a frame rotatable in a horizontal plane, a casing pivotally mounted on the frame for tilting movements in a vertical plane, radio apparatus carried by the casing, an oscilloscope mounted on the casing and connected to the radio apparatus to indicate signals, an azimuth disc positioned near the oscilloscope, said disc having marked thereon a plurality of radial lines spaced apart at equal intervals, a mirror positioned above the disc to reflect said lines, a scale marked on the mirror, a sheet of glass positioned to receive reflections from the mirror and to enable the oscilloscope to be viewed simultaneously with the images of the scale and radial lines and the face of the oscilloscope superimposed, and means to rotate the azimuth disc in a one to one ratio reversely to the horizontal rotation of the frame.

6. A radio location device comprising: first means for radiating and receiving radio signals; second means for adjusting the position of the first means in at least a horizontal plane; third means responsive to operation of the first means for indicating the straight-line distance to an object being located, these third means including first indicating means on which the distance is indicated; fourth means responsive to operation of the first means for indicating the azimuth of the object, these fourth means including second indicating means on which the azimuth is indicated; and viewing means for presenting to an observer in a single view the indications produced by both the third and fourth means, the viewing means including an element which has both transparent and reflecting properties; one of the indicating means being located rearwardly of the element and thus viewed through it, while the other indicating means is located forwardly of the element and thus viewed by reflection from it.

7. A radio location device comprising: first means for radiating and receiving radio signals; second means for adjusting the position of the first means in at least a horizontal plane; third means responsive to operation of the first means for indicating the straight-line distance to an object being located, these third means including a first scale on which the distance is indicated; fourth means responsive to operation of the first means for indicating the azimuth of the object, these fourth means including a second scale bearing azimuth markings; and viewing means including optical means for merging images of the first and second scales, the optical means and the first and second scales being so positioned with respect to each other that the image of the first scale acts as a pointer to indicate on the image of the second scale the azimuth of the object.

8. A radio location device, as described in claim 7, in which the optical means include an element which has both transparent and reflecting properties, one of the scales being located rearwardly of the element and thus viewed through it, while the other scale is located forwardly of the element and thus viewed by reflection from it.

9. A radio location device comprising: first means for radiating and receiving radio signals; second means for adjusting the position of the first means in both a horizontal plane and a vertical plane; third means responsive to operation of the first means for indicating the straight-line distance to an object being located, these third means including a first scale on which the distance is indicated; fourth means responsive to operation of the first means for indicating the azimuth of the object, these fourth means including a second scale bearing azimuth markings; a third scale bearing markings from which the altitudes and horizontal distances of the objects being located may be determined; viewing means including optical means for merging images of the three scales; fifth means which, through the viewing means and in response to changes in position of the first means in a vertical plane, rotate the image of the first scale with respect to the image of the third scale; the optical means and the first and third scales being so positioned with respect to each other that the image of the first scale acts as a pointer to indicate on the image of the third scale those markings which correspond to the object.

10. A radio location device, as described in claim 9, in which the optical means and the first and second scales are so positioned with respect to each other that the image of the first scale acts as a pointer to indicate on the image of the second scale the azimuth of the object.

11. A radio location device, as described in claim 9, in which the optical means include an element which has both transparent and reflecting properties, at least one of the three scales being located rearwardly of the element and thus viewed through it, while the other scales are located forwardly of the element and thus viewed by reflection from it.

12. A radio location device, as described in claim 9, in which the optical means include an element which has both transparent and reflecting properties, at least one of the three scales being located rearwardly of the element and thus viewed through it, whi'e the other scales are located forwardly of the element and thus viewed by reflection from it; the optical means and the first and second scales also being so positioned with respect to each other that the image of the first scale acts as a pointer to indicate on the image of the second scale the azimuth of the object.

13. A radio location device comprising first means for radiating and receiving radio signals, second means for adjusting the position of the first means in at least a horizontal plane, third means responsive to operation of the first means for indicating the straight-line distance to an object being located, these third means including a first scale on which the distance is indicated, a cone including a second scale of azimuth-indicating lines radiating from its apex, means for rotating the cone in response to rotation of the first means in a horizontal plane, and viewing means including optical means for merging images of the first and second scales, the optical means and the first and second scales being so positioned with respect to each other that the image of the first scale acts as a pointer to indicate on the second scale the azimuth of the object.

14. A radio location device, as described in claim 13, in which the optical means include an element which has both transparent and reflecting properties, one of the scales being located rearwardly of the element and thus viewed through it, while the other scale is located forwardly of the element and thus viewed by reflection from it.

RICHARD H. RANGER.

REFERENCES CITED

The following references are of record in the file of this patent:

UNITED STATES PATENTS

| Number | Name | Date |
| --- | --- | --- |
| 2,143,035 | Smith | Jan. 10, 1939 |
| 2,189,549 | Hershberger | Feb. 6, 1940 |
| 2,231,929 | Lyman | Feb. 18, 1941 |
| 2,251,984 | Cleaver et al. | Aug. 12, 1941 |
| 2,301,826 | Steudel et al. | Nov. 10, 1942 |
| 2,405,231 | Newhouse | Aug. 6, 1946 |
| 2,408,848 | Hammond | Oct. 8, 1946 |
| 2,409,448 | Rost | Oct. 15, 1946 |
| 2,412,631 | Rice | Dec. 17, 1946 |
| 2,419,567 | Labin | Apr. 29, 1947 |
| 2,430,292 | Hershberger | Nov. 4, 1947 |

FOREIGN PATENTS

| Number | Country | Date |
| --- | --- | --- |
| 111,594 | Australia | Mar. 19, 1939 |